(12) United States Patent
Birnbaum

(10) Patent No.: US 7,199,896 B2
(45) Date of Patent: Apr. 3, 2007

(54) SYSTEMS AND METHODS FOR EFFICIENTLY GENERATING AND SUPPLYING IMAGE DATA FOR TANDEM PRINTERS

(75) Inventor: David Birnbaum, Greensboro, NC (US)

(73) Assignee: Xerox Corporation, Stamford, CT (US)

( * ) Notice: Subject to any disclaimer, the term of this patent is extended or adjusted under 35 U.S.C. 154(b) by 769 days.

(21) Appl. No.: 10/250,019

(22) Filed: May 29, 2003

(65) Prior Publication Data

US 2004/0239961 A1 Dec. 2, 2004

(51) Int. Cl.
H04N 1/40 (2006.01)

(52) U.S. Cl. .................... 358/1.16; 358/502

(58) Field of Classification Search ............... 358/1.9, 358/2.1, 1.15–1.18, 1.12, 500, 502, 504
See application file for complete search history.

(56) References Cited

U.S. PATENT DOCUMENTS 5,365,074 A * 11/1994 Genovese ............ 250/559.29
6,366,755 B1 * 4/2002 Takashima ................ 399/254
6,486,972 B1 * 11/2002 Hasegawa .................. 358/1.9
6,529,289 B1 * 3/2003 Konno et al. .............. 358/1.17
6,819,447 B1 * 11/2004 Sawano .................... 358/1.16
6,934,049 B1 * 8/2005 Yamada .................... 358/1.16

* cited by examiner

Primary Examiner—Thomas D. Lee
Assistant Examiner—Stephen Brinich
(74) Attorney, Agent, or Firm—Oliff & Berridge, PLC

(57) ABSTRACT

A page to be printed is organized into a plurality of strips. To rendered the page using a tandem printer, each strip is rendered a plurality of times, once for each print engine of the tandem printer. Each time the selected strip is rendered for a different one of the print engines, the rendered image data for that print engine is stored into a separate memory area, such as a buffer, associated with that print engine Once a selected strip is rendered and the rendered image data stored into the associated memory areas, the rendered image data is used by the appropriate print engines to form image portions on a receiving sheet corresponding to the rendered image data. At the same time, a next strip is selected and repeatedly rendered for each of the print engines.

15 Claims, 9 Drawing Sheets

|  | FIRST PROCESSING ENGINE | SECOND PROCESSING ENGINE | $q^{th}$ PROCESSING ENGINE | $(n-1)^{th}$ PROCESSING ENGINE | $n^{th}$ PROCESSING ENGINE |
|---|---|---|---|---|---|
| FIRST STEP | FIRST STRIP |  |  |  |  |
| SECOND STEP | SECOND STRIP | FIRST STRIP |  |  |  |
| ...$x^{th}$ STEP... | $(q+w+2)^{th}$ STRIP | $(q+w+1)^{th}$ STRIP | ...$x^{th}$ STRIP... | $(q-y-1)^{th}$ STRIP ... | $(q-y-2)^{th}$ STRIP |
| $(n+m-2)^{th}$ STEP |  |  |  | $m^{th}$ STRIP | $(m-1)^{th}$ STRIP |
| $(n+m-1)^{th}$ STEP |  |  |  |  | $m^{th}$ STRIP |

*FIG. 5*

|  | FIRST PROCESSING ENGINE | SECOND PROCESSING ENGINE | THIRD PROCESSING ENGINE | FOURTH PROCESSING ENGINE |
|---|---|---|---|---|
| FIRST STEP | FIRST STRIP | | | |
| SECOND STEP | SECOND STRIP | FIRST STRIP | | |
| THIRD STEP | THIRD STRIP | SECOND STRIP | FIRST STRIP | |
| FOURTH STEP | | THIRD STRIP | SECOND STRIP | FIRST STRIP |
| FIFTH STEP | | | THIRD STRIP | SECOND STRIP |
| SIXTH STEP | | | | THIRD STRIP |

FIG. 6

|  | FIRST PROCESSING ENGINE | SECOND PROCESSING ENGINE | THIRD PROCESSING ENGINE | FOURTH PROCESSING ENGINE |
|---|---|---|---|---|
| FIRST STEP | FIRST STRIP |  |  |  |
| SECOND STEP | SECOND STRIP | FIRST STRIP |  |  |
| THIRD STEP | THIRD STRIP | SECOND STRIP | FIRST STRIP |  |
| FOURTH STEP | FOURTH STRIP | THIRD STRIP | SECOND STRIP | FIRST STRIP |
| FIFTH STEP |  | FOURTH STRIP | THIRD STRIP | SECOND STRIP |
| SIXTH STEP |  |  | FOURTH STRIP | THIRD STRIP |
| SEVENTH STEP |  |  |  | FOURTH STRIP |

FIG. 7

|  | FIRST PROCESSING ENGINE | SECOND PROCESSING ENGINE | THIRD PROCESSING ENGINE |
|---|---|---|---|
| FIRST STEP | FIRST STRIP | | |
| SECOND STEP | SECOND STRIP | FIRST STRIP | |
| THIRD STEP | THIRD STRIP | SECOND STRIP | FIRST STRIP |
| FOURTH STEP | FOURTH STRIP | THIRD STRIP | SECOND STRIP |
| FIFTH STEP | | FOURTH STRIP | THIRD STRIP |
| SIXTH STEP | | | FOURTH STRIP |

FIG. 8

|  | FIRST PROCESSING ENGINE | SECOND PROCESSING ENGINE | THIRD PROCESSING ENGINE | FOURTH PROCESSING ENGINE |
|---|---|---|---|---|
| FIRST STEP | FIRST STRIP OF FIRST PAGE |  |  |  |
| SECOND STEP | SECOND STRIP OF FIRST PAGE | FIRST STRIP OF FIRST PAGE |  |  |
| THIRD STEP | THIRD STRIP OF FIRST PAGE | SECOND STRIP OF FIRST PAGE | FIRST STRIP OF FIRST PAGE |  |
| FOURTH STEP | FOURTH STRIP OF FIRST PAGE | THIRD STRIP OF FIRST PAGE | SECOND STRIP OF FIRST PAGE | FIRST STRIP OF FIRST PAGE |
| FIFTH STEP | FIRST STRIP OF SECOND PAGE | FOURTH STRIP OF FIRST PAGE | THIRD STRIP OF FIRST PAGE | SECOND STRIP OF FIRST PAGE |
| SIXTH STEP | SECOND STRIP OF SECOND PAGE | FIRST STRIP OF SECOND PAGE | FOURTH STRIP OF FIRST PAGE | THIRD STRIP OF FIRST PAGE |
| SEVENTH STEP | THIRD STRIP OF SECOND PAGE | SECOND STRIP OF SECOND PAGE | FIRST STRIP OF SECOND PAGE | FOURTH STRIP OF FIRST PAGE |
| EIGHTH STEP | FOURTH STRIP OF SECOND PAGE | THIRD STRIP OF SECOND PAGE | SECOND STRIP OF SECOND PAGE | FIRST STRIP OF SECOND PAGE |
| NINTH STEP |  | FOURTH STRIP OF SECOND PAGE | THIRD STRIP OF SECOND PAGE | SECOND STRIP OF SECOND PAGE |
| TENTH STEP |  |  | FOURTH STRIP OF SECOND PAGE | THIRD STRIP OF SECOND PAGE |
| ELEVENTH STEP |  |  |  | FOURTH STRIP OF SECOND PAGE |

*FIG. 9*

SYSTEMS AND METHODS FOR EFFICIENTLY GENERATING AND SUPPLYING IMAGE DATA FOR TANDEM PRINTERS

BACKGROUND OF THE INVENTION

1. Field of Invention

This invention relates to tandem image processing.

2. Description of Related Art

In tandem image processing, the image forming device includes a plurality of tandem image processors, which can be of any known type. Accordingly, a plurality of portions, such as separate color separation layers, of an image can be processed in an overlapping, parallel manner. For example, tandem color printing can be used to achieve color printing at high speeds.

A tandem printer can include, for example, two, three, four or more sets of tandem print engines. These print engines can be of any desired type. In various tandem printers, the plurality of tandem print engines print the plurality of colors in an overlapping, parallel manner. In some exemplary embodiments, cyan, yellow, magenta, and/or black print engines are used to produce cyan, yellow, magenta, and/or black image portions, respectively.

SUMMARY OF THE INVENTION

Tandem color printing, however, places large demands on the electronic imaging system, which must generate in parallel a plurality of separate color separation layer images. For example, extensive resources, including one or more of processing capability, memory and/or other processing resources, are necessary to manipulate the data representing the different color separation layer images. However, using multiple electronic imaging subsystems and/or large memory buffers to manage and temporarily store the multiple color separation images adds further cost and complexity to the tandem printer system.

This invention provides systems and methods that efficiently render portions of each of a plurality of separate images for each of a plurality of tandem print engines.

This invention separately provides systems and methods that store the rendered image portions in relatively small memory portions.

This invention separately provides systems and methods that render and store the image portions for the plurality of rendering engines in series.

This invention separately provides systems and methods that output a first set of rendered image portions to the plurality of print engines in parallel.

In various exemplary embodiments, the systems and methods according to this invention reduce the amount of memory required to render the image data for the plurality of tandem printer engines. Various exemplary embodiments of the systems and methods according to this invention reduce printing time, and enable smaller printers.

In various exemplary embodiments, a page to be printed is organized into a plurality of strips. To render the page using a tandem printer according to this invention, each strip is selected in turn. Each strip is rendered a plurality of times, once for each print engine of the tandem printer. Each time the selected strip is rendered for a different one of the print engines, the rendered image data for that print engine is stored into a separate memory area, such as a buffer, associated with that print engine.

In various exemplary embodiments, once a selected strip is rendered and the rendered image data stored into the associated memory areas, the rendered image data is used by the appropriate print engines to form image portions on a receiving sheet corresponding to the rendered image data. At the same time, a next strip is selected and repeatedly rendered for each of the print engines.

In various exemplary embodiments, the memory area for each print engine is up to approximately twice the size of the amount of rendered image data obtained from one strip. In this case, for each print engine, as the rendered image data for a previous strip is read from the associated memory area and used to drive that print engine, the next strip is rendered to generate the rendered image data for that print engine. In this case, while each strip is rendered the plurality of times, that strip may be rendered alternatingly with one or more other strips. In this case, the rendered image data for one print engine is rendered from a selected strip. Then, the rendered image data for a different print engine is rendered from another strip before the rendered image data for another print engine is rendered from the first strip.

In various other exemplary embodiments, the size of the memory areas is different for the different print engines. In general, the size of the memory area for a particular print engine is a function of where that print engine is in the series of print engines of the tandem printer. In this case, all of the rendered image data for the print engines can be rendered from a selected strip before a next strip is selected.

In various exemplary embodiments, a strip of a page to be printed is selected. The selected strip is resolved into a plurality of single color strips and rendered. The rendered image data for each single-color strip is printed using a separate print engine of the tandem printer. The rendered image data for each of the single color strips is routed to a separate buffer or a separate portion of a memory.

These and other features and advantages of this invention are described in, or are apparent from, the following detailed description of the systems and methods according to exemplary embodiments of this invention.

BRIEF DESCRIPTION OF THE DRAWINGS

FIG. 1 illustrates one exemplary embodiment of a tandem image forming device that the systems and methods according to this invention are usable with;

FIG. 5 is a chart that illustrates one exemplary embodiment of the operation of a generic tandem printer having n print engines and that is to print the image in n strips;

FIG. 6 is a chart that illustrates in greater detail the operation of a tandem printer that has 4 print engines and that prints the image using 3 strips;

FIG. 7 is a chart that illustrates in greater detail the operation of a tandem printer that has 4 print engines and that prints the image using 4 strips;

FIG. 8 is a chart that illustrates in greater detail the operation of a tandem printer that has 3 print engines and that prints the image using 4 strips; and FIG. 9 is a chart that illustrates in greater detail the operation of a tandem printer that has 4 print engines, where each page is divided into 4 strips.

DETAILED DESCRIPTION OF EXEMPLARY EMBODIMENTS

The following detailed description of various exemplary embodiments of the systems and methods for generating image data for, and supplying the generated image data to, the print engines of a tandem image forming system may refer to one specific type of image forming apparatus, a xerographic image forming apparatus, for sake of clarity and familiarity. However, it should be understood that the systems and methods according to this invention can be used with any known or later-developed type of tandem image forming system.

Figure 1:
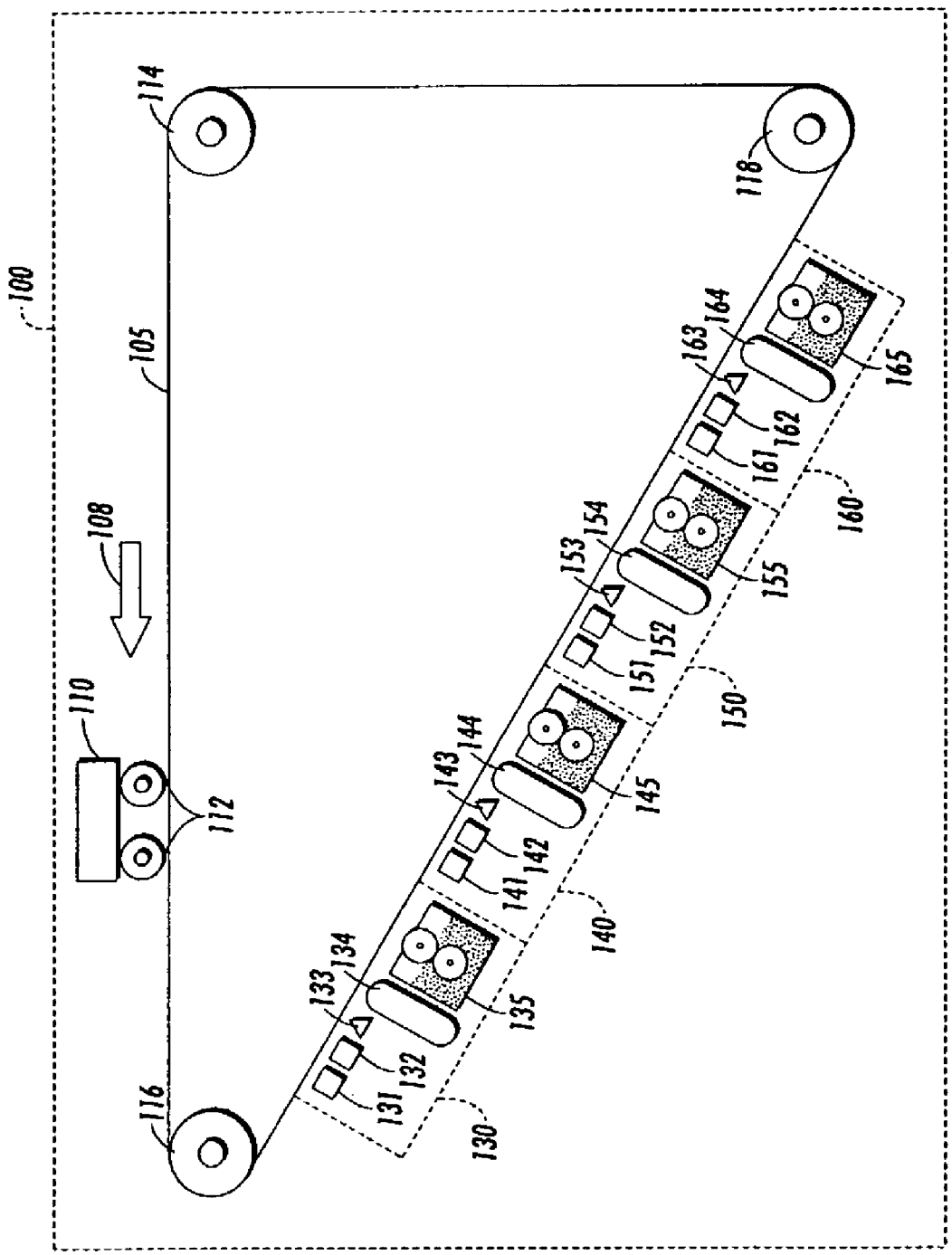

FIG. 1 illustrates one exemplary embodiment of a xerographic color image forming apparatus 100 which uses a charge-retentive surface 105. In various exemplary embodiments, the charge-retentive surface 105 is a photoreceptor belt that is supported by rollers 114, 116 and 118. The charge-retentive surface travels in the direction indicated by the arrow 108 over and around the rollers 114, 116 and 118. The charge-retentive surface 105 is advanced by driving a pair of contact rollers 112 using a motor 110. The charge-retentive surface 105 is advanced past various different image forming stations 130, 140, 150 and 160. In various exemplary embodiments, each image forming station 130–160 applies one color of charged toner to the charge-retentive surface. In various exemplary embodiments, there are four colors of toner used to create a full color image, comprising the colors cyan, magenta, yellow and black. However, it should be appreciated that more or fewer different colors could be used to create the image.

In operation, the charge-retentive surface 105 travels to a discharging station 120 that places the charge-retentive surface 105 at a residual charge state. That is, the discharging device 120 neutralizes the charge on the photoreceptor belt 105 to a residual level. The charge-retentive surface 105 is then transported past a first image forming station, or first color station, 130. One or more charging devices 131 and 132 of the first image forming station 130 charge the charge-retentive surface of the belt 105 to a relatively high and, ideally, a substantially uniform, potential. In various exemplary embodiments, the charge-retentive surface 105 is negatively charged. However, it should be understood that the systems and methods according to this invention could be used with a positively-charged charge-retentive surface.

Next, an exposure device 134 of the first image forming station 130 selectively discharges areas of the charge-retentive surface 105 corresponding to the image area for the toner color developed using the first image forming station 130. In various exemplary embodiments, the exposure device 134 is a raster output scanner (ROS) or other laser-based output scanning device. The charge-retentive surface 105 then proceeds to the developer device 135 of the first image forming station 130. In various exemplary embodiments, the developer device 135 contains charged toner and one or more insulative magnetic brushes that contact the latent electrostatic image formed on the charge-retentive surface 105 to deposit negatively charged toner material on the exposed portions of the charge-retentive surface 105 containing the latent electrostatic image. However, any developer device and developing technique could be used.

The charge-retentive surface 105 next advances to a second image forming station 140. The second image forming station 140 includes one or more charging devices 141 and 142 that re-apply a uniform charge to the charge-retentive surface 105 to recharge the charge-retentive surface 105 to the relatively high, and ideally, substantially uniform potential. The raster output scanner, or other exposure device, 144 re-exposes those portions of the charge-retentive surface 105 on which the next color toner is to be deposited. The next color toner is then applied by a developer station 145 to develop the latent electrostatic image. The process continues until the charge-retentive surface has passed the remaining image forming stations 150 and 160, containing one or more charging devices 151 and 152 and an exposure device 154, and one or more charging devices 161 and 162 and an exposure device 164, respectively. After toner from the developer stations 155 and 165 have been deposited on the charge-retentive surface, the developed image is then transferred to a support substrate such as paper.

During runtime, each of the different image forming stations 130, 140, 150 and 160 operate concurrently. At each period of time during operation of the image forming apparatus 100, each different image forming station 130, 140, 150 and 160 creates a different color separation layer for a different document, a different page of a single document and/or for a different portion of a page of a document. In this way, the different image forming stations 130, 140, 150 and 160 operate in tandem to create the images at a high rate.

Figure 2:
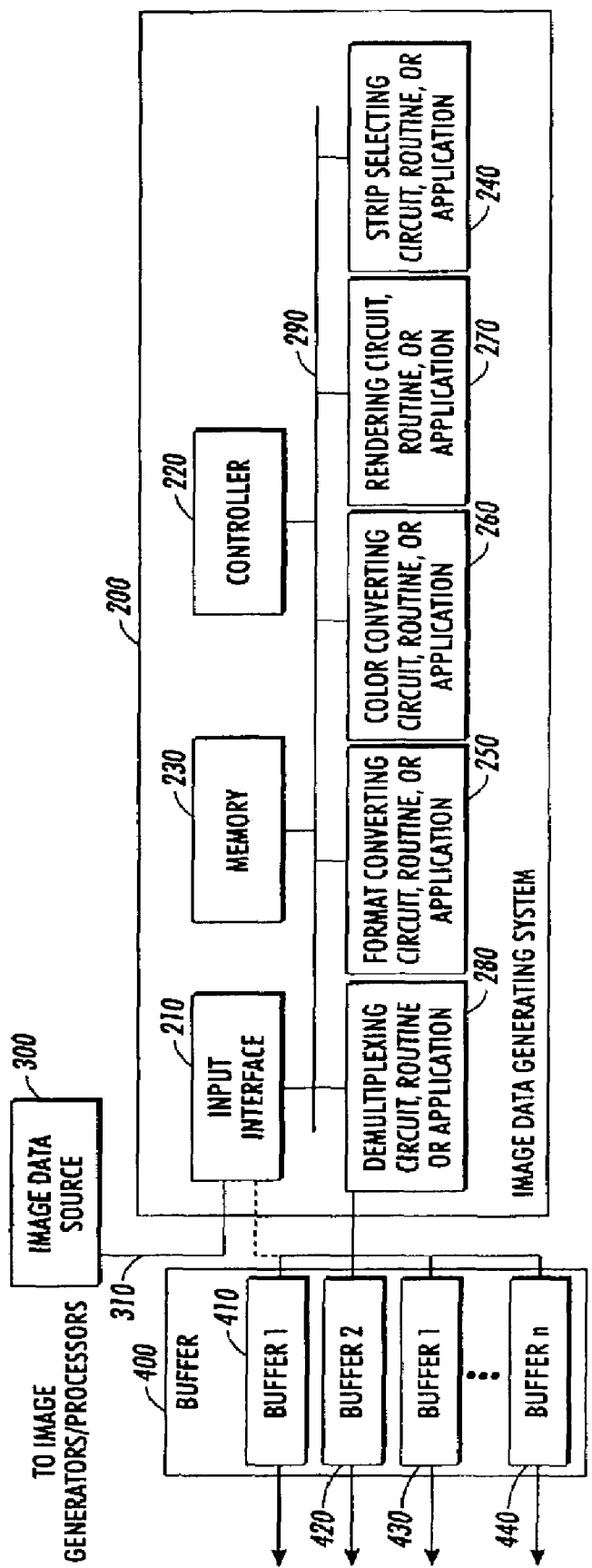
FIG. 2 is a block diagram of one exemplary embodiment of an image data rendering system according to this invention.

FIG. 2 is a block diagram outlining one exemplary embodiment of an image data generating system 200 and an image data supplying system 400 usable to efficiently generate and supply image data to the print engines of the tandem engine forming apparatus 100. As shown in FIG. 2, the image data generating system 200 includes an input/output interface 210, a controller 220, a memory 230, a strip selecting circuit, routine, or application 240, a format converting circuit, routine, or application 250, a color converting a circuit, routine, or application 260, a rendering circuit, routine, or application 270, and a demultiplexing circuit, routine, or application 280, interconnected by one or more control and/or data busses and/or application program interfaces 290.

As shown in FIG. 2, the image data generating system 200 is, in various exemplary embodiments, implemented using a programmed general purpose computer. However, the image data generating system 200 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3 and 4, can be used to implement the image data generating system 200.

As shown in FIG. 2, the memory 230 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

As shown in FIG. 2, an image data source 300 is connected to the image data generating system 200 over a link 310. The image data source 300 can be a digital camera, a scanner, or a locally or remotely located computer, or any other known or later-developed device that is capable of generating electronic image data. Similarly, the image data source 300 can be any suitable device that stores and/or transmits electronic image data, such as a client or a server of a network. The image data source 300 can be integrated with the image data generating system 200, as in a digital copier having an integrated scanner. Alternatively, the image data source 300 can be connected to the image data generating system 200 over a connection device, such as a modem, a local area network, a wide area network, an intranet, the Internet, any other distributed processing network, or any other known or later-developed connection device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 300 is thus any known or later-developed device which is capable of supplying electronic image data over the link 310 to the image data generating system 200. The link 310 can thus be any known or later-developed system or device for transmitting the electronic image data from the image data source 300 to the image data generating system 200.

When the image data source 300 is a personal computer, the link 310 connecting the image data source 300 to the image data generating system 200 can be a direct link between the personal computer and the image data generating system 200. The link 310 can also be a local area network, a wide area network, the Internet, an intranet, or any other distributed processing and/or storage network. Moreover, the link 310 can also be a wireless link to the image data source 300. Accordingly, it should be appreciated that the image data source 300 can be connected using any known or later-developed system that is capable of transmitting data from the image data source 300 to the image data generating system 200.

As shown in FIG. 2, the input/output interface 210 receives data from the image data source 300 over link 310, and under control of the controller 220, stores the received data in the memory 230. The strip selecting circuit, routine or application 240 selects, in turn and, in general, but not necessarily, in order along a process direction of the image, each image data strip from the received image data or from the stored image data (if the received image data is stored before being processed).

The format converting circuit, routine or application 250 converts the image data from the present format of the selected strip, which can be any given format, into a format that can be printed by the image forming apparatus, such as CMYK color image data. The color converting circuit, routine or application 260 converts a strip of multicolor image data into a plurality of strips, where each of the plurality of strips forms a specific color separation layer corresponding to one of the different color toners or inks used by the tandem print engines 130–160.

In various exemplary embodiments, the image rendering circuit, routine or application 270 converts a color separation layer strip into raster image data or other printer-ready data that is usable by one of the raster output-scanners 134, 144, 154 or 164 of the tandem print engines 130–160 to expose the charge-retentive surface 105. Of course, if the print engines 130–160 require a different format for the image data, the image rendering circuit, routine or application 270 renders the image data of each color separation layer strip into the printer-ready format that is appropriate for that print engine. The demultiplexing circuit, routine or application 280 directs the generated printer-ready data for a given color separation layer strip to a memory structure or device, such as one of the buffer elements 410–440 of the buffer 400, that stores the printer-ready image data for the appropriate print engine 130–160 corresponding to that color separation.

As shown in FIG. 2, the buffer 400 can also be connected to the one or more data and/or control busses or application programming interfaces 290. Alternatively, as shown in FIG. 2, the buffer 400 can optionally be connected directly to the demultiplexing circuit, routine or application 280, or can optimally be connected to the input/output interface 210. As shown in FIG. 2, the buffer 400 can be implemented using n different buffer memory devices 410–440, where each buffer memory device 410–440 is dedicated to one of the n print engines 130–160. Alternatively, the buffer 400 can be implemented using a single memory device, along with a control structure, that allows different portions of the single memory device to be associated with different ones of the print engines 130–160. In various other exemplary embodiments, the buffer 400 can be implemented as part of the memory 230, rather than being separate and/or distinct from the memory 230. In this case, in various exemplary embodiments, the buffer 400 could be connected with the print engines 130–160 via links to the various print engines from the input/output interface 210. However, it should be appreciated that, in various exemplary embodiments, the print engines 130–160 could be connected directly to the memory 230.

During operation, the image data generating system 100 receives image data at the input/output interface 210 from the image data source 300. The image data is provided from the input/output interface to the memory 230. The image data is usually in an intermediate image format that organizes the image data into strips, such as, for example, TIFF. The strip selecting circuit, routine or application 240 selects a strip of the image data from the memory 230.

The selected image data is provided from the strip selecting circuit, routine or application 240, or from the memory 230, under control of the strip selecting circuit, routine or application 240, to the format converting circuit, routine or application 250. The format converting circuit, routine or application 250 converts the format of the selected image data step from the intermediate image format to a printer-ready format that is usable by the print engine 130–160.

The converted image data in the printer-ready format is output, under control of the controller 220, from the format converting circuit, routine or application 250 to either the memory 230 for interim storage or directly to the color converting circuit, routine or application 260. The color converting circuit, routine or application 260 separates the converted full-color image data output by the format converting circuit, routine or application 250 into a plurality of color separation image data layers. In particular, there will be one color separation image data layer for each different color toner or ink implemented in the tandem image forming system 100 and thus for each different print station 130–160.

The plurality of color separation image data layer strips are output, under control of the controller 220, from the color converting circuit, routine or application 260 either directly to the image rendering circuit, routine or application 270, or to the memory 230 for interim storage. The image rendering circuit, routine or application 270 inputs the plurality of color separation image data layer strips and converts each color separation image data layer strip into raster data, or the appropriate data for the print engines 130–160, that the print engines 130–160 can use to create a toned (or inked) image.

The rendered raster data for the print engines 130–160 is then output, under control of the controller 220, from the image rendering circuit, routine or application 270 directly to the demultiplexing circuit, routine or application 280 or to the memory 230 for interim storage. The demultiplexing circuit, routine or application 280, in various exemplary embodiments, directs each different set of rendered raster data (which was rendered from a different color separation layer image data strip) to a corresponding one of the buffers 410, 420, 430 or 440. The raster data is then stored in that buffer 410, 420, 430 or 440 until the associated print engine 130, 140, 150 or 160, respectively, is ready for it. In various exemplary embodiments, rather than using physically distinct buffer memory devices, the buffers 410–440 can be physically or logically distinct portions of the memory 230.

In various other exemplary embodiments, the image rendering circuit, routine or application 270 generates the raster data for only one color separation layer strip for a given selected strip at a time. In this case, the raster data is generated by the image rendering circuit, routine or application 270 for 4 different selected strips, one color separation layer strip for each different selected strip, before another color separation layer strip is rendered for any of the 4 different selected strips. In this way, when each different print engine is printing the data corresponding to a different selected strip, as shown in FIGS. 5–9, the buffers 410–440 will receive the rendered image data for the next strip to be printed by each print engine without having to buffer more than the image data currently being printed and the next strip of image data to be printed.

It should be appreciated that, in this case, the format converting circuit, routine or application 250 and the color converting circuit, routine or application 260 can operate on an input strip before the strip selecting circuit, routine or application 240 selects a given strip for operation by the image rendering circuit, routine or application 270. In this case, the strip selecting circuit, routine or application 240 selects one of the color separation layer strips.

It should be understood that each of the circuits shown in FIG. 2 can be implemented as portions of a suitably programmed general purpose computer. Alternatively, each of the circuits shown in FIG. 2 can be implemented as physically distinct hardware circuits within an ASIC, or using a FPGA, a PLD, a PLA or a PAL, or using discrete logic elements or discrete circuit elements. The particular form each of the circuits shown in FIG. 2 will take is a design choice and will be obvious and predicable to those skilled in the art.

It should be appreciated that the buffers 410, 420, 430 and 440 can be implemented as functionally distinct portions of a single device that is large enough to accommodate the rendered image data for at least two strips for each of the print engines 130–160. In various exemplary embodiments, the buffer device 400 can be connected directly to the image rendering circuit, routine or application 280, to the one or more control and/or data busses or application programming interfaces 290, or to the input/output interface 210. These various options are illustrated in FIG. 2.

It should be appreciated that the image data generating system 200 can be implemented as software executing on a programmed general purpose computer, a special purpose computer, a microprocessor or the like. In this case, the image data generating system 200 can be implemented as a routine embedded in a printer driver, as a resource residing on a server, or the like. The image data generating system 200 can also be implemented by physically incorporating it into a software and/or hardware system, such as the hardware and software systems of a printer or a digital photocopier.

Figure 3:
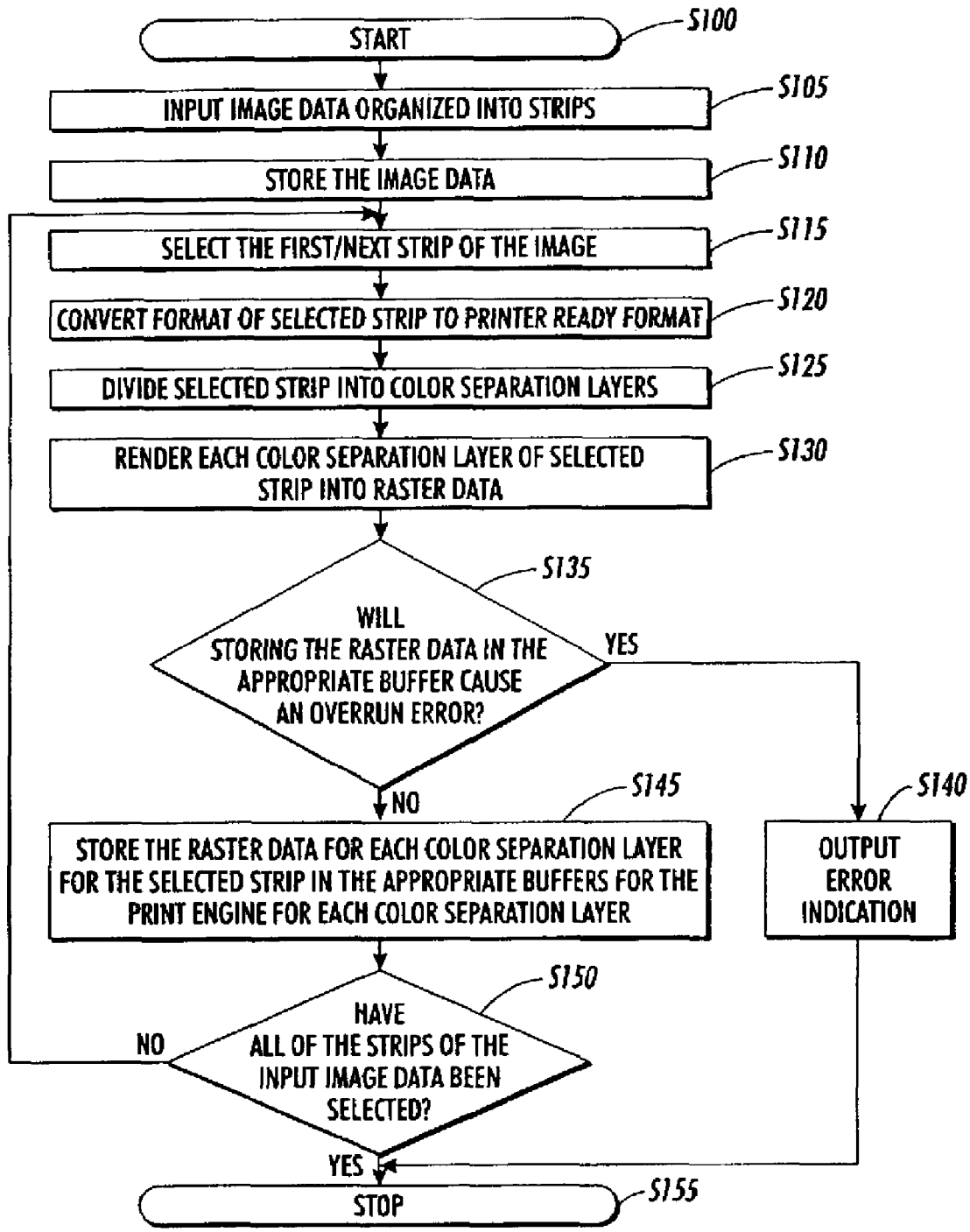
FIG. 3 is a flowchart outlining one exemplary embodiment of a method for rendering image data for a tandem image forming device according to this invention.

FIG. 3 is a flowchart outlining one exemplary embodiment of a method for efficiently generating image data for tandem color printing according to this invention. As shown in FIG. 3, operation of the method begins in step S100, and continues to step S105, where image data that is organized into strips is input. Next, in step S110, the input image data is stored. Then, in step S115, the first/next strip of the image to be processed is selected. Operation then continues to step S120.

In step S120, the selected strip is converted from the intermediate format, such as TIFF, into a printer-ready format, such as a bitmap. Next, in step S125, the converted selected strip is divided into a plurality of color separation layers, where each color separation layer corresponds to one of the print engines of the tandem image forming apparatus. Then, in step S130, each of the color separation layer strips are converted into raster data (or some other appropriate printer-usable format). Operation then continues to step S135.

In step S135, a determination is made whether writing the raster data, or the like, that was generated in step S130, will cause any of the buffers to overrun. If so, operation continues to step S140. Otherwise, operation jumps to step S145. In step S140, an overrun error is output. Operation then jumps to step S135. In contrast, in step S145, the generated raster data for each color separation layer strips for the currently selected strip is written to the print engine buffer corresponding to that color separation layer. Next, in step S150, a determination is made whether there are any more strips of the received image data to be processed. If so, operation jumps back to step S115. Otherwise, operation continues to step S155, where operation of the image data generating method ends.

It should be appreciated that the above-outlined description of FIG. 3 assumes that, in steps S125–S150, all of the image processing to be applied to each selected strip is fully applied in each step before the next step is performed. In various other exemplary embodiments, each of steps S125–S150 is performed once for each color separation layer before any of steps S125–S150 are performed for the next color separation layer. That is, in these exemplary embodiments, one color separation layer, such as, for example, the cyan layer, is generated from the selected full color strip, converted to raster data or the like, and stored into the buffer for the cyan print engine before the next color separation layer, such as, for example, the yellow layer, is generated.

Alternatively, in various other exemplary embodiments, steps S120 and S125 are performed before, rather than after, step S115. In this case, when step S115 is performed, a color separation layer strip, rather than an input strip, is selected. In this case, a color separation layer strip for one input strip can be selected and operated on in step S130 independently of the other color separation layer strips for that one input strip.

Figure 4:
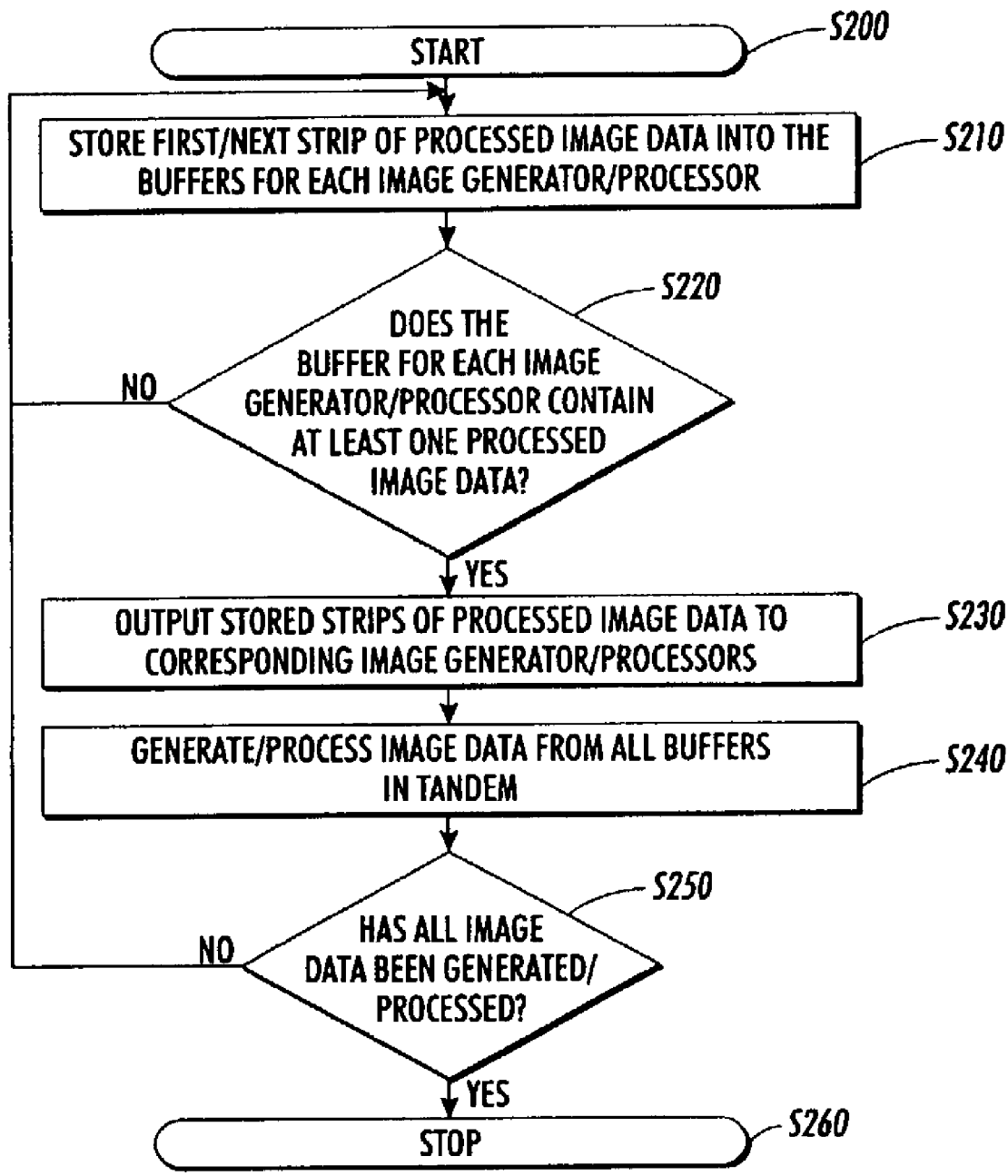
FIG. 4 is a flowchart of one exemplary embodiment of a method for drawing data from one or more buffers provided with data according to this invention to supply data to tandem image forming devices according to this invention.

FIG. 4 is a flowchart outlining one exemplary embodiment of a method for supplying strips of rendered image data to print engines of a tandem image forming apparatus according to this invention. As shown in FIG. 4, operation of the method begins in step S200, and continues to step S210, where a first (or next) strip of processed image data is stored into each buffer corresponding to each different print engine. Then, in step S220, a determination is made whether the buffer corresponding to each image generator/processor contains data corresponding to at least one strip of image data. If not, operation returns to step S210. This loop continues until there is sufficient data in at least the buffer corresponding to a first one of the print engines. At that time, operation continues to step S230.

In step S230, the one or more stored strips of processed image data are output to the corresponding print engines. Next, in step S240, the one or more output strips of processed image data are used by the corresponding print engines to form different color separation layers on an image receiving medium, such as an intermediate charge-retaining surface, such as the charge-retaining surface 105.

Then, in step S250, a determination is made as to whether all of the strips of image data have been output from the buffers. If any of the buffers are not empty, or data including the end of the image data has not been received, operation returns to step S210. Otherwise, operation continues to step S260, where operation of the method ends.

FIG. 5 is a chart that outlines how image data that is divided into a strip is printed according to the systems and methods according to this invention by a tandem image forming apparatus having n print engines. As shown in FIG. 5, the first print engine inputs first color separation data for a first strip of image data from the first print engine buffer and prints a first color separation image of this first strip. Next, in a second processing step, the first print engine inputs first color separation data for a second strip of image data from the first print engine buffer, while the second print engine inputs second color separation data for the first strip of image data from the second print engine buffer. Accordingly, while the first print engine forms an image of the first color separation of the second strip, the second print engine forms an image of the second color separation of the first strip. In general, the second print engine forms the image of the second color separation of the first strip on the image of the first color separation of the first strip.

In an $x^{th}$ step, a $q^{th}$ print engine forms the image of the $q^{th}$ color separation layer of the $x^{th}$ strip, while upstream print engines, such as the first and second print engines, form the first and second color separation images of the $(x+q)^{th}$ and $(x+q-1)^{th}$ strips, respectively. At the same time, the $n^{th}$, or last, print engine and the $(n-1)^{th}$, or next-to-last print engine print the image of the $n^{th}$ color separation of the $(x-n)^{th}$ strip and the image of the $(n-1)^{th}$ color separation of the $(x-(n-1))^{th}$ strip.

Finally, in an $(n+m-2)^{th}$ step, the $(n-1)^{th}$ print engine forms the image of the $(n-1)^{th}$ color separation layer for the $m^{th}$, or last, strip. At the same time, the $n^{th}$ print engine forms the image of the $n^{th}$, or last, color separation layer for the $(m-1)^{th}$ or next to last, strip. Then, in an $(n+m-1)^{th}$ step, the $n^{th}$ print engine forms the image of the $n^{th}$ color separation layer for the $n^{th}$, or last, strip.

It should be appreciated that, after the first print engine prints the first color separation layer for the $m^{th}$, or last, strip of one image, such as a page or a document, the first print engine can begin printing, after a suitable interval, the first color separation layer of a first strip of a next image. In this way, all of the n print engines print the corresponding color separation layers of n different strips in tandem. This is shown in greater detail in FIGS. 6–9, which illustrate how different combinations of number of strips per image, number of color separation layers/print engines and number of images are implemented to tandem print images in strips according to the systems and methods of this invention.

It should be appreciated that, to ensure that all of the n buffers for a tandem image forming apparatus having n print engines have sufficient print data, one or more sets of at least the color converting circuit, routine or application 260, the rendering circuit, routine or application 270 and the demultiplexing circuit, routine or application 280 will have to operate at a speed that is effectively n times as fast as the data read rate of the n print engines. That is, since the n print engines read n portions of image data from the n buffers during each unit time period, the demultiplexing circuit, routine or application 280 will need to output at least n portions of image data to the n buffers during each unit time period, so that the n buffers do not empty before the end of the image data.

It should be appreciated that, depending on the relative cost of processing speed and processing hardware, rather than implementing the tandem image generating system 200 using circuits, routines or applications and the supporting hardware that can operate at least in part at n times the data rate of the print engines, 2 to n sets of various ones or more of the circuits, routines or applications (and/or the supporting hardware) can be used to implement the tandem image generating hardware.

Thus, for a tandem image forming apparatus that has 4 print engines, at least the color converting circuit, routine or application 260, the rendering circuit, routine or application 270 and the demultiplexing circuit, routine or application 280 can operate at 4 times the data rate of the 4 print engines. Alternatively, 2 sets of at least the color converting circuit, routine or application 260, the rendering circuit, routine or application 270 and the demultiplexing circuit, routine or application 280 can operate at 2 times the data rate of the 4 print engines. In any case, because each set of at least the color converting circuit, routine or application 260, the rendering circuit, routine or application 270 and the demultiplexing circuit, routine or application 280 operates on a strip of the image data at a time, each set of at least the color converting circuit, routine or application 260, the rendering circuit, routine or application 270 and the demultiplexing circuit, routine or application 280 can switch between 2, 4 or n of the different color separation layers for each strip before beginning on the next strip, so that each buffer is resupplied with image data before that buffer is emptied by the corresponding print engine.

It should also be appreciated that 4 sets of at least the color converting circuit, routine or application 260 and the rendering circuit, routine or application 270 can operate at the same data rate, or faster, as the data rate of the 4 print engines. Additionally, it should also be appreciated that, in this exemplary embodiment, the demultiplexing circuit, routine or application 280 could, and probably would, be omitted. However, like the other exemplary embodiments, because each set of at least the color converting circuit, routine or application 260 and the rendering circuit, routine or application 270 operates on a strip of the image data at a time, each set of at least the color converting circuit, routine or application 260 and the rendering circuit, routine or application 270 can switch between 2, 4 or n of the different color separation layers for each strip before beginning on the next strip. As a result, even if the color converting circuit, routine or application 260 and the rendering circuit, routine or application 270 are not multiplexed each buffer is resupplied with image data before that buffer is emptied by the corresponding print engine.

It should also be appreciated that, in various exemplary embodiments, the tandem printers usable with various exemplary embodiments of the systems and methods according to this invention can print on only one side of the receiving sheet (simplex printing), or are able to print on both sides of the receiving sheet (duplex printing). Thus, the particular form of the tandem printer that uses an exemplary embodiments of the systems and methods according to this invention is not critical.

While particular embodiments have been described, alternatives, modifications, variations, improvements, and substantial equivalents, whether known or that are or may be presently unforeseen, may become apparent to applicants or others skilled in the art. Accordingly, the exemplary embodiments of the invention, as set forth above, are intended to be illustrative, not limiting. Various changes may be made without departing from the spirit and scope of the invention. Therefore, the appended claims as filed and as they may be amended are intended to embrace all known or later-developed alternatives, modifications variations, improvements, and substantial equivalents.

The invention claimed is:

1. A method for printing a plurality of images in tandem using a number n of print engines, comprising:
    inputting color image data to be printed using at least two of the number n of the print engines, the color image data organized into a plurality of input data strips, a number of the input data strips combining to form a single image;
    selecting a first input data strip;
    generating at least one color separation layer strip from the selected input data strip;
    converting at least one of the at least one color separation layer strip into raster data usable by a corresponding one of the n print engines to form an image strip on a substrate; and
    storing, for each converted at least one color separation layer strip, the raster data for that color separation layer strip into a memory associated with the corresponding one of the n print engines.

2. The method of claim 1, further comprising repeating at least the converting and storing steps for each of a total of n color separation layer strips.

3. The method of claim 1, further comprising repeating at least the generating, converting and storing steps for each of n−1 other input data strips.

4. The method of claim 1, further comprising repeating the selecting, generating, converting and storing steps for each of n−1 other input data strips.

5. The method of claim 1, wherein:
    generating at least one color separation layer strip from the selected input data strip comprises generating n color separation layer strips from the selected input data strip;
    converting at least one of the at least one color separation layer strip into raster data usable by a corresponding one of the n print engines to form an image strip on a substrate comprises converting each of the n color separation layer strips into raster data; and
    storing, for each of the n converted color separation layer strips, the raster data for that color separation layer strip into a memory associated with the corresponding one of the n print engines.

6. The method of claim 1, further comprising repeating at least the generating, converting and storing steps for one color separation layer strip for each of n−1 other input data strips during a time period corresponding to a time period used by the n print engines to form the image strip on the substrate.

7. The method of claim 6, further comprising repeating at least the generating, converting, storing and repeating steps for each of a plurality of the time periods until all of the color separation layer strips of all of the input image data strips have been stored in the memory.

8. The method of claim 1, further comprising repeating the generating, converting, storing and repeating steps for each of the strips of input image data.

9. A method for printing a plurality of images in tandem using a number n of print engines, comprising:
    inputting color image data to be printed using at least two of the number n of the print engines, the color image data organized into a plurality of input data strips, a number of the input data strips combining to form a single image;
    generating n one color separation layer strips from each input data strip;
    selecting a first color separation layer strip of a first input data strip;
    converting the selected color separation layer strip into raster data usable by a corresponding one of the n print engines to form an image strip on a substrate; and
    storing the raster data for the converted color separation layer strip into a memory associated with the corresponding one of the n print engines.

10. The method of claim 9, further comprising repeating at least the selecting, converting and storing steps for each of a total of n color separation layer strips.

11. The method of claim 9, further comprising repeating at least the selecting, converting and storing steps for one color separation layer strip for each of n−1 other input data strips.

12. The method of claim 9, further comprising repeating at least the selecting, converting and storing steps for one color separation layer strip for each of a total of n input data strips during a time period corresponding to a time period used by the n print engines to form one image strip on the substrate.

13. The method of claim 12, further comprising repeating at least the selecting, converting, storing and repeating steps for each of a plurality of the time periods until all of the color separation layer strips of all of the input image data strips have been stored in the memory.

14. The method of claim 9, further comprising repeating the generating, selecting, converting, storing and repeating steps for each of the strips of input image data.

15. An image data generating system useable to generate image data for a tandem image forming apparatus that includes a number n of print engines that print in tandem, the system comprising:
    an input interface usable to input image data from an image data source, the input image data organized into a plurality of input image data strips, a number of the input data strips combining to form a single image;

a selecting component that selects one of the input image data strips;

a generating component that generates at least one color separation layer strip from the selected input image data strip;

a converting component that converts at least one color separation layer strip into a raster image data strip that is usable by one of the n print engines to form a corresponding color separation layer image on a substrate;

a storing component that stores the raster image data strip into a memory associated with the one of the n print engines.

* * * * *